(12) United States Patent
Hubach et al.

(10) Patent No.: US 9,078,399 B2
(45) Date of Patent: Jul. 14, 2015

(54) BELT TRACKING USING SLEEVES AND ROTATING BELT GUIDES

(75) Inventors: Frederick R. Hubach, Stevens, PA (US); James D. Walker, Lititz, PA (US); Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 268 days.

(21) Appl. No.: 13/568,166

(22) Filed: Aug. 7, 2012

(65) Prior Publication Data

US 2014/0041537 A1 Feb. 13, 2014

(51) Int. Cl.
*B30B 5/06* (2006.01)
*A01F 15/18* (2006.01)

(52) U.S. Cl.
CPC ............ *A01F 15/18* (2013.01); *A01F 2015/186* (2013.01)

(58) Field of Classification Search
CPC .... A01F 15/07; A01F 15/18; A01F 2015/186
USPC ........ 100/87, 88, 89; 384/272–276, 280–282; 474/100, 177–178; 56/341; 198/37, 198/835, 842
See application file for complete search history.

(56) References Cited

U.S. PATENT DOCUMENTS

| | | | |
|---|---|---|---|
| 1,050,400 A * | 1/1913 | Steele | 198/817 |
| 2,627,223 A * | 2/1953 | Berge | 100/13 |
| 3,797,215 A | 3/1974 | Kopaska | |
| 3,964,246 A * | 6/1976 | Kopaska | 56/341 |
| 3,992,987 A | 11/1976 | Sereg | |
| 4,077,315 A | 3/1978 | Meiers | |
| 4,205,513 A | 6/1980 | Shokoples | |
| 4,717,027 A * | 1/1988 | Laure et al. | 209/620 |
| 4,890,449 A | 1/1990 | Hering | |
| 4,993,217 A | 2/1991 | Pfrimmer et al. | |
| 5,097,760 A | 3/1992 | Ratzlaff et al. | |
| 5,219,063 A * | 6/1993 | Wyatt | 198/840 |
| 5,284,457 A * | 2/1994 | Gerstenberger et al. | 474/95 |
| 6,094,899 A * | 8/2000 | Viesselmann | 56/341 |
| 6,364,062 B1 * | 4/2002 | Ericson et al. | 187/264 |
| 6,651,403 B2 | 11/2003 | Anstey | |

FOREIGN PATENT DOCUMENTS

WO WO 2013/152990 A1 * 10/2013 ............. A01F 15/18

* cited by examiner

*Primary Examiner* — Shelley Self
*Assistant Examiner* — Leonel Vasquez
(74) *Attorney, Agent, or Firm* — Patrick M. Sheldrake; Seyed V. Sharifi T.

(57) ABSTRACT

An improved belt guide system has individual guide sleeves mounted on one or more of the guide rolls, one sleeve for each belt, in an agricultural round baler. Each sleeve encircles the roll surface of the guide roll and is positioned between the belt and the guide roll surface in a manner allowing relative rotational movement between the sleeve and the guide roll. Each guide sleeve is thus allowed to match the peripheral speed of the respective belt as it passes over the guide roll and allow slippage to occur between the guide roll surface and the inner circumference of the guide sleeve. Flanges extending radially outwardly on each sleeve end maintain the sleeve alignment with the respective belt.

19 Claims, 4 Drawing Sheets

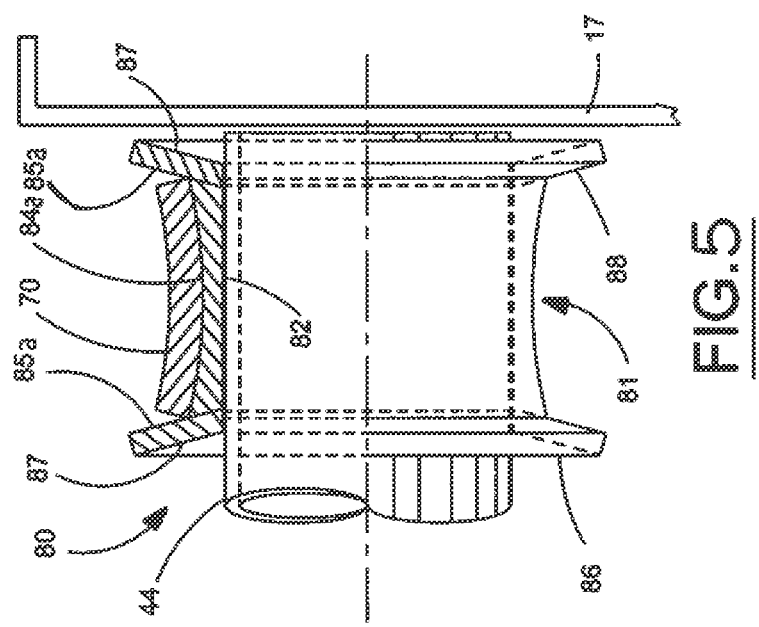

BELT TRACKING USING SLEEVES AND ROTATING BELT GUIDES

BACKGROUND OF THE INVENTION

The present invention relates generally to agricultural round balers which form cylindrical bales using one or more movable belts and/or rollers disposed in a bale-forming chamber and, more particularly to an improved system for guiding the movable belts around fixed rolls to improve belt tracking.

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Prior art round balers generally have an expandable bale chamber defined by a pair of fixed sidewalls, and a plurality of side-by-side belts cooperating with a series of transverse rolls mounted between the fixed sidewalls. Some guide rolls are fixed in position while others may be mounted on moveable apparatus such as a moveable tailgate to control the belts during tailgate opening and closing. The chamber includes an inlet opening in the front through which crop material is fed. Also included is a pair of take up arms pivotally mounted on the main frame, between which arms multiple of guide rolls are journalled. A biasing force is applied on the take up arms to urge the outer surfaces of the guide rolls against the belts to maintain belt tension and prevent slack from occurring in the belts during expansion and contraction of the chamber.

Guide rolls traditionally comprise an elongate, rotating cylinder spanning the width of the bale chamber between the side walls around which all of the belts comprising the bale forming chamber are directed. Variations in length among the individual belts causes belt slippage as all belts engage the guide roller at a uniform peripheral speed across the roller width. Belt slippage causes increases friction and wear on the belts. It may also lead to belts wandering laterally across the rollers and deviating from their straight line tracking. The result is increased wear on the belts, potential damage to the belts, and diminished baler performance. In the extreme, excessive friction and the resultant heat poses a risk of fire in the baler. The traditional method of maintaining proper belt tracking involves incorporating fixed guides along which the edges of the moving belts slide as they are rotated around the bale chamber. Friction between the moving belt edges and the fixed guides still result in increased belt wear and reduced belt service life.

It would be desirable to provide an improved belt roller system for a round baler that would improve individual belt tracking in the baler and alleviate the problems with known belt tracking solutions.

SUMMARY OF THE INVENTION

Accordingly, the present invention, in any of the embodiments described herein, may provide one or more of the following advantages:

It is an object of the present invention to provide a guide apparatus for improving belt tracking in an agricultural round baler that reduces sliding friction between the belts and the guide rolls.

It is a further object of the present invention to provide a belt guide apparatus for an agricultural round baler comprising a plurality of independently rotating guide sleeves, one for each belt in the baler, mounted on one or more of the rotating guide rollers.

It is a further object of the present invention to provide an improved belt guide system that accommodates minor variations in relative belts speeds at the guide roller caused by variations in belt length while reducing friction between the belts and guide roller.

It is a further object of the present invention to provide an improved belt guide system that is easily incorporated into existing baler designs with minimal design alteration.

It is a still further object of the present invention to provide an improved belt guide system having individual sleeves, one for each belt, arranged on each fixed roll allowing the peripheral speed of each belt/sleeve interface to vary independently thereby improving belt tracking around the bale forming chamber.

It is a still further object of the present invention to provide an improved belt guide system having individual sleeves mounted on to the guide rolls for each belt in an agricultural round baler that is durable in construction, inexpensive of manufacture, carefree of maintenance, easily assembled, and simple and effective to use.

These and other objects are achieved according to the instant invention by providing an improved belt guide system comprising individual guide sleeves mounted on one or more of the guide rolls, one sleeve for each belt in an agricultural round baler. Each sleeve encircles the roll surface of a guide roll and is positioned between the belt and the guide roll surface in a manner allowing relative rotational movement between the sleeve and the guide roll. Each guide sleeve is thus allowed to match the peripheral speed of the respective belt as it passes over the guide roll and allow slippage to occur between the guide roll surface and the inner circumference of the guide sleeve. Flanges extending radially outwardly on each sleeve end maintain the sleeve alignment with the respective belt.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a detail view of another embodiment of a guide sleeve side of the present invention as used in the agricultural round baler of FIG. 1.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
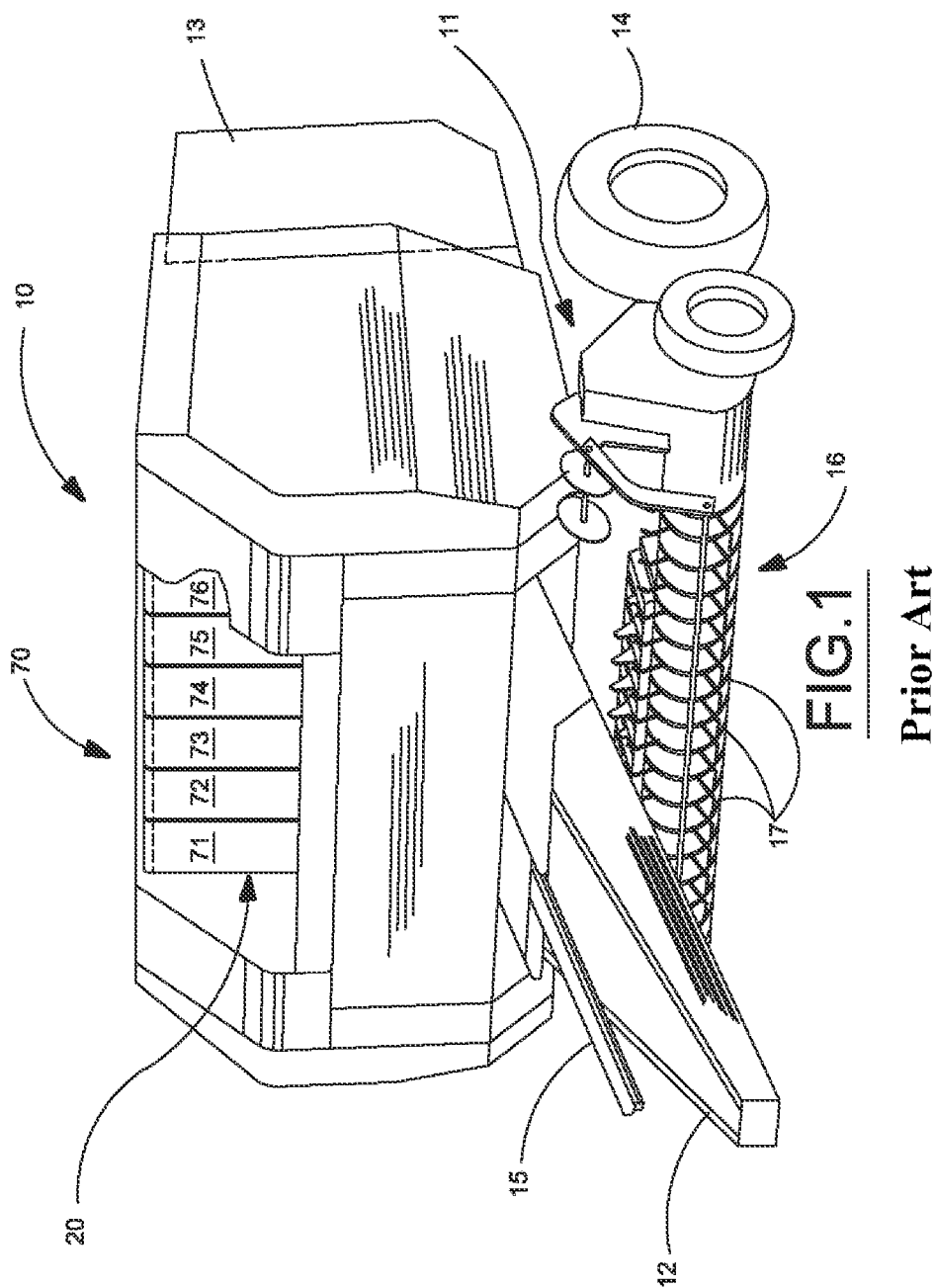
FIG. 1 is a perspective view of a typical agricultural round baler on which the present invention is useful.
Figure 2:
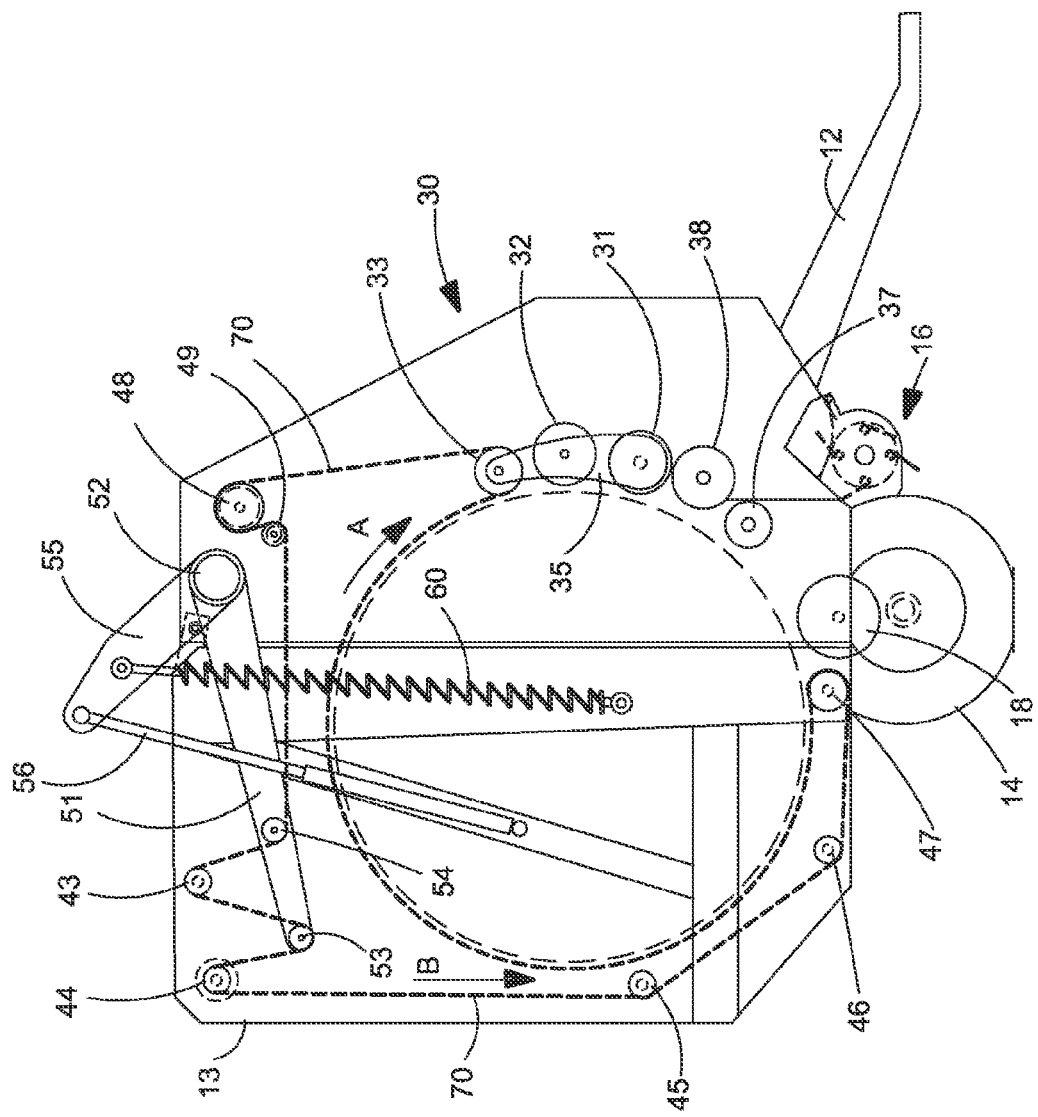
FIG. 2 is a side section view of the round baler of FIG. 1 showing the bale forming chamber as defined by the path of the rolling belts and guide rolls.

Referring to the figures, a generally well-known round baler 10 which incorporates the preferred embodiment of the present invention, includes a main frame 11 supported by a pair of wheels 14 (only one shown). A tongue 12 is provided for connection to a tractor. Pivotally connected to the sides of main frame 11 is tailgate 13 which may be closed (as shown in FIGS. 1 and 2) during bale formation or pivoted open by a tailgate actuator (not shown) to discharge a completed bale. A conventional pickup 16 mounted on main frame 11 includes a reel with a plurality of tines 17 movable in predetermined paths to lift crop material from the ground and deliver it rearwardly toward an interior bale forming chamber 20.

Rounds balers of the aforementioned type are well known in the art. Exemplar balers are described in U.S. Pat. Nos. 4,870,812 and 5,367,865, both to Jennings et al., each being incorporated herein by reference.

The bale forming chamber 20 for forming bales is defined partly by a sledge assembly 30 comprising a plurality of rollers 31, 32 extending transversely between side walls 17 in the arcuate arrangement shown in FIG. 2. Rollers 31, 32 are journalled at their ends in a pair of spaced apart arms 35, one of which is shown. These arms are pivotally mounted inside main frame 11 on stub shafts for providing movement of sledge assembly 30 between a bale starting position and a full bale position as shown in FIG. 1. Rollers 31, 32 are driven in a clockwise direction by conventional means (i.e., chains and sprockets or gears) connected to and powered by a prime mover via power take-off shaft 15. A freely rotatable idler roller 33 is also carried by arms 35. Additionally, a starter roll 37, and a fixed roll 38 are located adjacent to roller 31, and are also driven in a clockwise direction by the conventional means.

The bale forming chamber is further defined by an apron 70 comprising a plurality of continuous side-by-side belts 71, 72, 73, 74, 75, 76 supported by guide rolls 43, 44, 45, 46, 47 rotatably mounted in tailgate 13 and a drive roll 48, mounted on main frame 11. Apron 70 passes between roller 32 on sledge assembly 30 and idler roller 33, and is in engagement only with idler roller 33 and not roller 32 which is located in close proximity to the apron belts to strip crop material from the belts, in addition to its bale forming function. Drive roll 48 is powered via the power take-off 15 from the tractor and a drive train (not shown) which moves apron 70 along its changing path, indicated generally by arrows A and B in FIG. 2. An additional guide roll 49 ensures proper driving engagement between apron 40 and drive roll 48.

Each guide roll 43, 44, 45, 46, 47 comprises a generally cylindrical unitary roll surface extending substantially across the transverse width of the bale forming chamber 20. The ends of the guide rolls are rotatably connected by bearings or the like to the baler chassis or tailgate, preferably outside of the bale chamber side walls 15 to protect the bearings from debris inside the bale chamber. The plurality of continuous side-by-side belts 71, 72, 73, 74, 75, 76 is trained around the guide rolls 43, 44, 45, 46, 47. Rotation of the guide rolls 43, 44, 45, 46, 47 is caused by interaction with the moving belts; the guide rolls themselves are typically not actively rotated by the drive train powering drive roll 48. The unitary construction of the guide rolls defines the peripheral interface speed between the roll surface and the belts and necessarily requires that the peripheral interface speed be the same for each belt interfacing with the guide roll.

Figure 4:
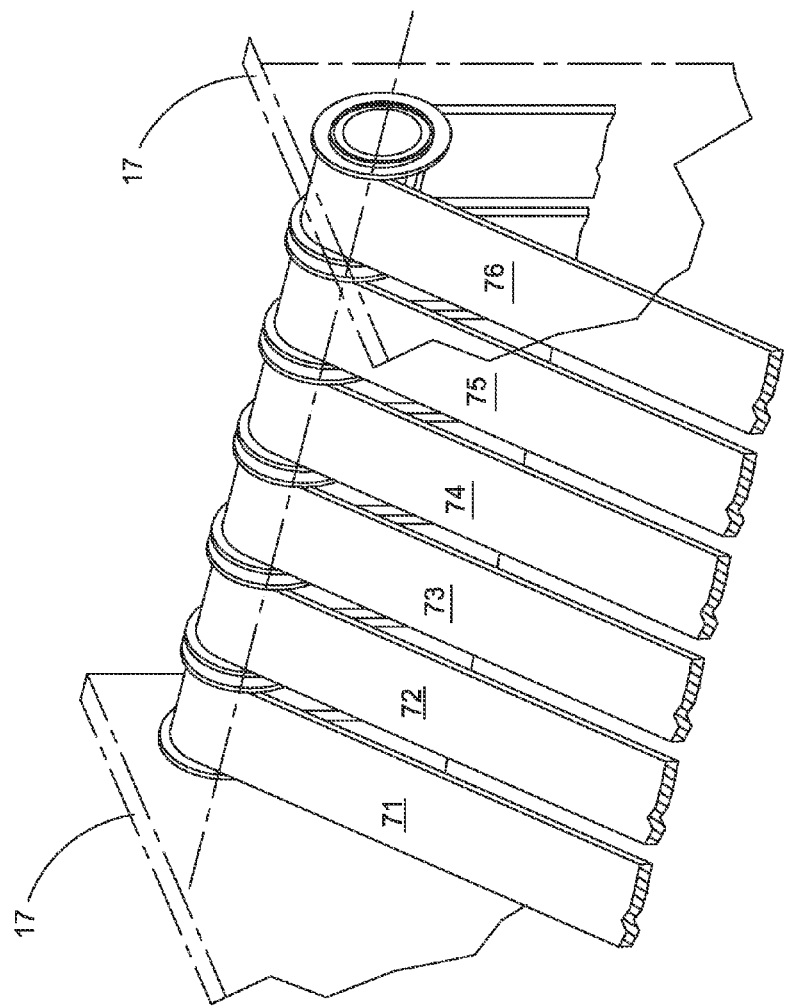
FIG. 4 partial perspective view of one of the guide rolls of the agricultural baler of FIG. 1 showing the relationship of the plurality of side-by-side belts and the guide sleeves.
Figure 3:
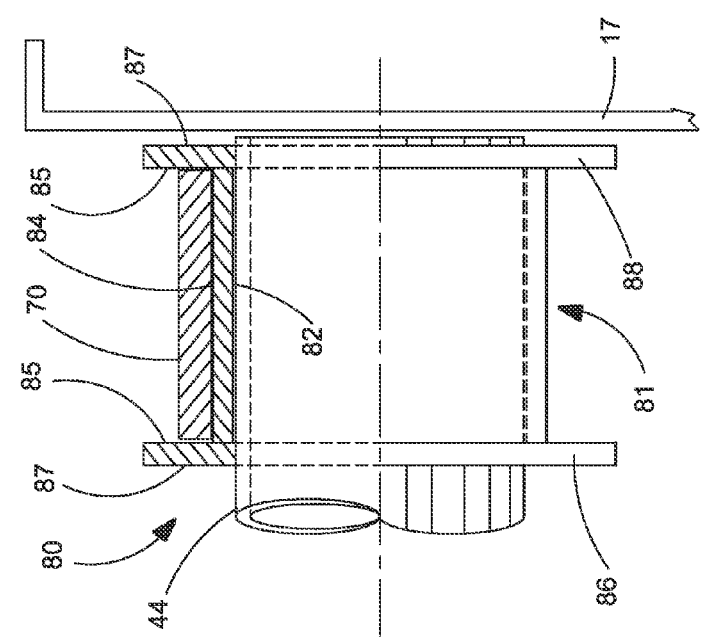
FIG. 3 is a detail view of one embodiment of a guide sleeve side of the present invention as used in the agricultural round baler of FIG. 1.

Referring to FIGS. 3 and 4, the present invention provides an easily incorporated improvement for belt tracking comprising a plurality of belt guide sleeves 80 which are positioned surrounding one or more of the guide rolls. Each belt guide sleeve comprises an elongate sleeve section 81 having an inner surface 82, an outer belt engagement surface 84, and a pair of flanges 86, 88 positioned at opposing ends thereof. The inner surface 82 is configured to closely fit around the outer surface of the guide rolls while allowing the guide sleeve 80 to slide axially along the roll outer surface and to rotate independent from the rotation of the guide roll. Rotational movement of the plurality of guide sleeves 80 is not intended to replace the rotation of the guide rolls 43, 44, 45, 46, 47 (i.e., the guide rolls continue to rotate), but instead allows relative differences in belt/guide sleeve peripheral speeds to be accommodated without causing slippage of the belts against the guide sleeves.

The guide sleeve 80 thickness between the inner 84 and outer 82 surface is sufficient to provide the desired structural strength for the sleeve. The extent of the sleeve section 81 is of sufficient width to allow a belt to be positioned between the interior faces 85 of the flanges 86, 88 to maintain the guide sleeve 80 in alignment with the belt as the belt is driven around the guide roll. Flanges 86, 88 also prevent interaction between adjacent belts, further reducing belt friction and resultant wear. The flange thickness between the interior face 85 and the exterior face 87 is sufficient to provide structural strength to the flange and may be increased as necessary to fill the desired spacing between adjacent belts. The interior faces 85 of the flanges may extend generally perpendicularly from the sleeve section or the faces 85a may be slanted slightly outwardly from the center of the sleeve, as shown in FIG. 5, to help center the guide sleeve 80 on its respective belt.

The outer belt engagement surface 84 of each guide sleeve may be cylindrical (i.e. the surface is parallel to the guide roller centerline for the full width of the sleeve section 81) or the engagement surface may be contoured to improve belt tracking on each guide sleeve. In one embodiment, shown in FIG. 5, the outer engagement surface 84a is slightly convex in profile with the perigee of the convex profile centered on the guide sleeve 80 length which causes the belt to track centered on the perigee and allows a desired centerline of each belt to be established by the guide sleeve.

One guide sleeve 80 is provide for each belt in the round baler, the guide sleeves preferably being positioned with exterior faces 87 of each sleeve 80 in adjacent contact along the transverse extent of the guide roll. The outboard guide sleeves are laterally restrained by the side walls 17 of the baler. Each guide sleeve 80, being independently moveable relative to the guide roll, allows for variation in peripheral speed between its respective belt and the guide roll to accommodate minor variations in belt length resulting from variations in the individual belt peripheral interface speed at the guide rolls. The guide rolls 43, 44, 45, 46, 47 continue to rotate such that the guide sleeves 80 are required only to accommodate the relative differences between individual belt speeds and the guide roll peripheral speed.

The guide sleeves 80 are preferably formed from a material that allows the sleeves to be positioned on the guide rolls and allows slippage between the guide roll and the sleeves to occur without requiring bearings or lubrication. Embodiments using nylon and polyurethane are contemplated for economic production cost while providing a durable sleeve. Guide sleeves using bearings or similar friction-reducing interface with the guide roll could be used, but at an increased manufacturing cost and complexity.

Belt guide sleeves 80 are installed on at least one guide roll. The belts will pass the remaining fixed guide rolls at a uniform peripheral speed. In the embodiment illustrated in the figures, the guide sleeves 80 are installed on upper tailgate guide roll 44. It is possible to install guide sleeves 80 on additional guide rolls to further enhance belt tracking performance. Preference is given to guide rolls which engage the belts for a higher percentage of their circumference, such as the upper guide rolls 43, 44, compared to guide rolls with less of their circumference engaged by the belts, such as lower guide rolls 45, 46.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural baler having a bale chamber, the baler comprising
   a guide roll configured and positioned for directing movement of a plurality of continuous side-by-side belts forming at least a portion of the bale chamber in a similar direction of belt movement,
   said guide roll comprising:
      an elongate roll having a roller axis and a generally cylindrical outer surface with a roller diameter centered on said roller axis, said outer surface extending substantially between and generally perpendicular to opposing, spaced-apart side walls of the baler; and
      a plurality of belt guides corresponding in number to said plurality of continuous side-by-side belts, each of said plurality of belt guides having an interior diameter, a co-axial exterior belt engaging surface, and a length defined between opposing ends greater than a width of each of said plurality of belts, said interior diameter being sized to encircle said outer surface and allow movement of each belt guide relative to said outer surface and independent rotation of each of said plurality of belt guides wherein the plurality of belt guides are independently rotatable in the direction of belt movement and configured such that the peripheral speed of a first one of a plurality of belt guides is variable from a second one of the plurality of belt guides.

2. The guide roll of claim 1, wherein said belt engaging surface is generally cylindrical.

3. The guide roll of claim 1, wherein said belt engaging surface is contoured to bias belt lateral position toward a preferred alignment.

4. The guide roll of claim 1, wherein each of said plurality of belt guides further comprises a pair of end flanges, one end flange disposed at each end of each said belt guide, said end flanges extending radially outwardly beyond said belt engaging surface sufficiently to maintain each respective belt in position between said pair of end flanges and in contact with at least a portion of said belt engaging surface.

5. The guide roll of claim 4, wherein said belt guides are rotated by interaction with the plurality of side-by-side belts.

6. The guide roll of claim 5, wherein said plurality of belt guides is formed from a material enabling rotation on said elongate roll without need of bearings.

7. The guide roll of claim 4, wherein said plurality of belt guides is positioned in end-to-end arrangement along the extent of the outer surface.

8. The guide roll of claim 4, wherein said pair of end flanges each comprise an inward face and said inward faces are generally perpendicular to said belt engaging surface.

9. The guide roll of claim 4, wherein said pair of end flanges each comprise an inward face and said inward faces are angled outwardly relative to a centerline of said belt engaging surface.

10. A guide roll for an agricultural round baler, the baler having a plurality of continuous side-by-side belts each having a belt width and a belt thickness, the plurality of belts trained around the guide roll, said guide roll comprising:
    an elongate roll having a roller axis and a generally cylindrical outer surface with a roller diameter centered on said roller axis, said outer surface extending substantially between opposing, spaced-apart side walls of the baler; and
    a plurality of side-by-side belt guides corresponding in number to said plurality of continuous side-by-side belts disposed between said outer surface and the plurality of belts, each of said plurality of belt guides having an interior diameter, a co-axial exterior belt engaging surface, and a length defined between opposing ends greater than said belt width, said interior diameter being sized to encircle said outer surface and allow movement of each belt guide axially relative to said outer surface wherein the plurality of belt guides are independently rotatable in the direction of belt movement and configured such that the peripheral speed of a first one of plurality of belt guides is variable from a second one of the plurality of belt guides, at least a portion said belt engaging surface in adjacent contact with a portion of a respective one of the plurality of belts trained around the elongate roll thereby causing rotation of respective said belt guide and elongate roll.

11. The guide roll of claim 10, wherein said belt engaging surface is generally cylindrical.

12. The guide roll of claim 10, wherein said belt engaging surface is contoured to bias belt lateral position toward a preferred alignment.

13. The guide roll of claim 10, wherein each of said plurality of belt guides further comprises a pair of end flanges, one end flange disposed at each end of each said belt guide, said end flanges extending radially outwardly beyond said outer surface sufficiently to maintain each respective belt in position between said pair of end flanges.

14. The guide roll of claim 13, wherein said pair of end flanges each comprise an inward face and said inward faces are generally perpendicular to said outer surface.

15. The guide roll of claim 13, wherein said pair of end flanges each comprise an inward face and said inward faces are angled relative to a perpendicular from said outer surface.

16. In an agricultural round baler having an expandable bale forming chamber defined by a plurality of continuous side-by-side belts disposed between a pair of generally parallel and spaced-apart side walls, the side-by-side belts being trained around a plurality of movable belt take-up rolls and a plurality of fixed guide rolls for movement in a first belt direction, the improvement in a belt guide roll comprising:

at least one elongate roll having a roller axis and a generally cylindrical outer surface with a roller diameter centered on the roller axis, the outer surface extending substantially between the side walls of the baler; and a plurality of side-by-side belt guides corresponding in number to the plurality of side-by-side belts disposed between the outer surface and the plurality of belts, each of the plurality of belt guides having an interior diameter, a co-axial exterior belt engaging surface, and a length defined between opposing ends greater than each individual belt width, the interior diameter being sized to encircle the outer surface and allow movement of each belt guide relative to the outer surface and independent rotation of each of the plurality of belt guides in a first rotational direction corresponding to movement of the plurality of belts in the first direction and configured such that the peripheral speed of a first one of plurality of belt guides is variable from a second one of the plurality of belt guides, at least a portion the belt engaging surface being in adjacent contact with a portion of a respective one of the plurality of belts trained around the elongate roll, contact therewith causing rotation of said elongate roll and respective said belt guide.

17. The improvement of claim 16, wherein each of the plurality of belt guides further comprises a pair of end flanges, one end flange disposed at each end of each belt guide, the end flanges extending radially outwardly beyond the exterior diameter sufficiently to maintain each respective belt laterally positioned between the pair of end flanges.

18. The improvement of claim 17, wherein the pair of end flanges each comprise an inward face arranged generally perpendicular to the roller axis.

19. The improvement of claim 17, wherein the pair of end flanges each comprise an inward face that is angled outwardly relative to a centerline of the belt engaging surface.

* * * * *